United States Patent [19]

Yagi

[11] Patent Number: 5,895,027
[45] Date of Patent: Apr. 20, 1999

[54] SOLENOID UNIT FOR AN AUTOMATIC TRANSMISSION UNIT

[75] Inventor: Sakai Yagi, Shizuoka-ken, Japan

[73] Assignee: Yazaki Corporation, Tokyo, Japan

[21] Appl. No.: 08/847,600

[22] Filed: Apr. 25, 1997

[30] Foreign Application Priority Data

May 9, 1996 [JP] Japan ................... 8-114937

[51] Int. Cl.⁶ .................................. F16K 31/02
[52] U.S. Cl. ............... 251/129.15; 137/884; 137/560
[58] Field of Search ............. 251/129.15; 303/119.2; 137/560, 884; 74/606 R; 439/397

[56] References Cited

U.S. PATENT DOCUMENTS

| 4,725,040 | 2/1988 | Fornuto et al. ............ 251/129.15 |
| 4,894,018 | 1/1990 | Phillips et al. . |
| 4,898,360 | 2/1990 | VonHayn et al. ........... 251/129.15 |
| 5,040,853 | 8/1991 | Burgdorf et al. ........... 303/119.2 |
| 5,199,456 | 4/1993 | Love et al. ............... 251/129.15 |
| 5,269,490 | 12/1993 | Fujikawa et al. ............ 137/884 |
| 5,275,478 | 1/1994 | Schmitt et al. ........... 251/129.15 |
| 5,415,562 | 5/1995 | Matsumoto et al. ........... 439/397 |
| 5,449,227 | 9/1995 | Steinberg et al. ............ 251/129.15 |

Primary Examiner—Denise L. Ferensic
Assistant Examiner—John Ball
Attorney, Agent, or Firm—Finnegan, Henderson, Farabow, Garrett & Dunner, L.L.P.

[57] ABSTRACT

A solenoid unit includes a plurality of solenoid valves having respective valve bodies for attachment with a main casing of an automatic transmission and a case equipped with the solenoid valves in a manner that the solenoid valves can be installed in the main casing collectively. In the unit, the wiring for the solenoid valves has been completed in the casing prior to assembling the unit to the automatic transmission unit. With the arrangement mentioned above, if only attaching the solenoid unit to the main casing, it is possible to assemble the valve bodies of the solenoid valves to the main casing with a predetermined arrangement. Further, since the wiring for the solenoid valves has been already completed in the case, it is possible to omit the post-operation, such as soldering.

8 Claims, 3 Drawing Sheets

SOLENOID UNIT FOR AN AUTOMATIC TRANSMISSION UNIT

BACKGROUND OF THE INVENTION

The present invention relates to a solenoid unit by which it is possible to install a plurality of solenoid valves in a main casing of an automatic transmission unit of a vehicle, collectively.

When assembling the plural solenoid valves in the automatic transmission unit of the vehicle, the solenoid valves have been individually installed in the main casing and furthermore, a wire harness and electrical wires for earthing have been connected to terminals of the respective solenoid valves by means of soldering or the like.

However, it should be noted that there is a drawback in workability in the above-mentioned method since the solenoid valves have to be assembled to the main casing individually and further, the wire harness and the earthing wires have to be connected to the solenoid valves individually.

SUMMARY OF THE INVENTION

Under such a circumstance, it is therefore an object of the present invention to provide a solenoid unit which allows a plurality of solenoid valves to be installed in a main casing of an automatic transmission unit for a vehicle, collectively.

The object of the present invention described above can be accomplished by a solenoid unit for an automatic transmission unit having a main casing, the solenoid unit comprising:

- a plurality of solenoid valves having respective attachment parts for attachment with the main casing of the automatic transmission; and
- a case in which the solenoid valves are arranged in a manner that the solenoid valves can be installed in the main casing collectively;
- wherein the wiring against the solenoid valves in the case has been completed.

With the arrangement mentioned above, if only attaching the solenoid unit to the main casing, it is possible to assemble the attachment parts of the solenoid valves to the main casing with a predetermined arrangement. Further, since the wiring for the solenoid valves has been already completed in the case, it is possible to omit the post-operation, such as soldering etc.

In the present invention, preferably, each of the solenoid valves is provided with a solenoid case and each of the solenoid valves includes pressure welding terminals for electrical connection, to which electrical wires are fitted under pressure respectively and which are arranged inside the solenoid case.

In the solenoid unit modified as above, the wiring can be completed by only pressure welding the electrical wires into the pressure welding terminals.

More preferably, each of the attachment parts is provided with an elastic member for compensating assembling deviations of the solenoid unit relative to the main casing of the automatic transmission unit.

Owing to the provision of the elastic member, it is possible to securely assemble the respective solenoid valves to predetermined positions in the main casing, irrespective of some amount of dimensional errors.

In the present invention, preferably, the elastic member is composed of a rubber packing for seal. In this case, owing to the provision of the packing, it is possible to realize the compensating of assembling error and the sealing between the solenoid unit and the main casing.

It is preferable that the case is provided with a ground terminal fixture also serving as fittings for attaching the case to the main casing and that the pressure welding terminals of the solenoid valves are electrically connected with the ground terminal fixture through the electrical wires, thereby providing a ground circuit.

In this solenoid unit, since the pressure welding terminals of the solenoid valves has been already connected with the ground terminal fixture prior to assembling the unit to the main casing, the ground connection of the respective solenoid valves can be automatically completed by only fixing the solenoid unit with the main casing of the automatic transmission unit.

In the invention, more preferably, the case comprises a case body and a cover locked on the case body for covering it, while the ground terminal fixture is composed of a base plate portion positioned in and fixed with the case of the solenoid unit and a fixing plate portion projecting from the case and having a bolt hole formed therein and preferably, the cover is provided with a pusher for depressing the base plate portion of the ground terminal fixture against the case body on condition that the cover is locked on the case body.

With the structure of the case composed of the case body and the cover, a worker can execute the inside wiring operation while opening the cover. Further, owing to the provision of the cover with the pusher, it is possible to increase the holding force of the case on the ground terminal fixture. Therefore, the stability of the solenoid unit fixed on the main casing can be improved.

Preferably, the case body has a plurality of locking projections arranged about an outer periphery of the case body, while the cover is provided with a plurality of locking frames for respective engagements with the locking projections, which are arranged about an outer periphery of the cover.

With the plural locking projections and frames, the cover can be engaged with the case body securely.

More preferably, the base plate portion of the ground terminal fixture is provided, on both sides thereof, with pressure welding portions into which the electrical wires are fitted under pressure. Owing to the provision of the pressure welding portions on both sides of the base plate portion, the wiring of the solenoid valves dispersed in the case body can be facilitated.

It is preferable that the ground terminal fixture is positioned at a substantial center of the case in a longitudinal direction thereof. With the arrangement of the ground terminal fixture, the solenoid unit can be supported by the main casing of the automatic transmission unit under the well-balanced condition.

These and other objects and features of the present invention will become more fully apparent from the following description and appended claims taken in conjunction with the accompany drawing.

DESCRIPTION OF THE PREFERRED EMBODIMENT

Figure 1:
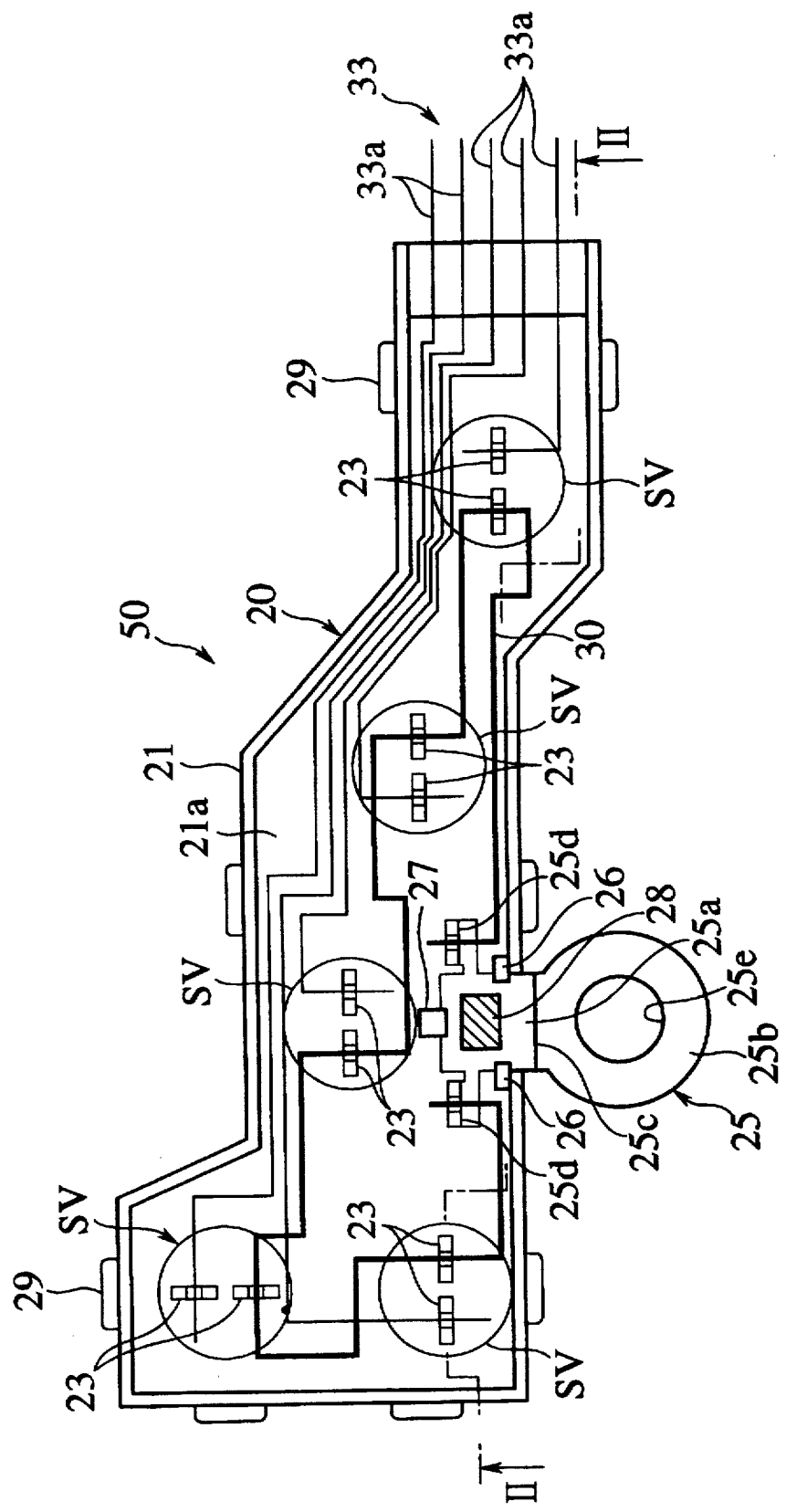
FIG. 1 is a plan view of a solenoid unit in accordance with an embodiment of the present invention, showing an interior of the unit.
Figure 2:
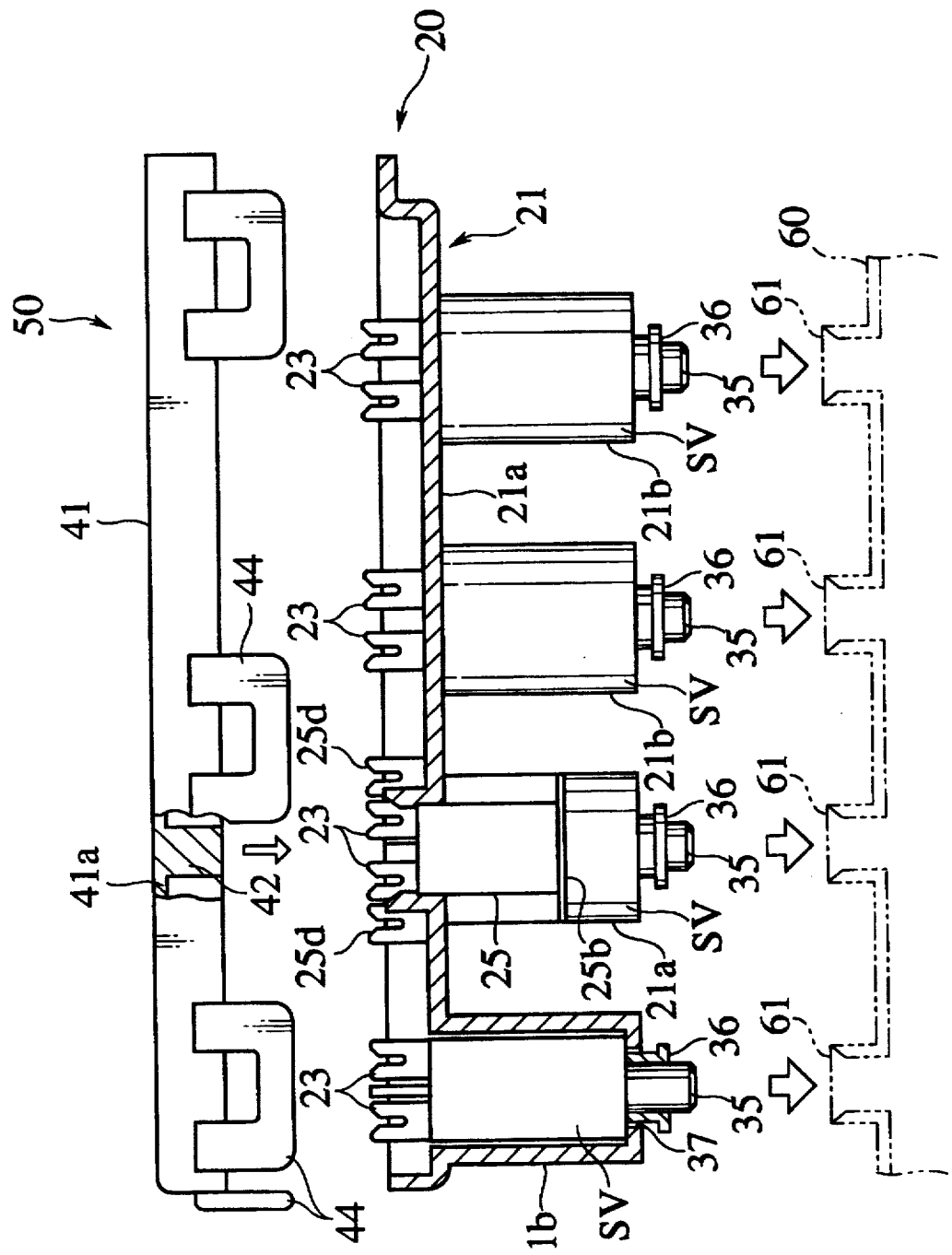
FIG. 2 is a partial cross sectional view of the solenoid unit having a cover detached from a case, taken along a line II—II of FIG. 1.
Figure 3A:
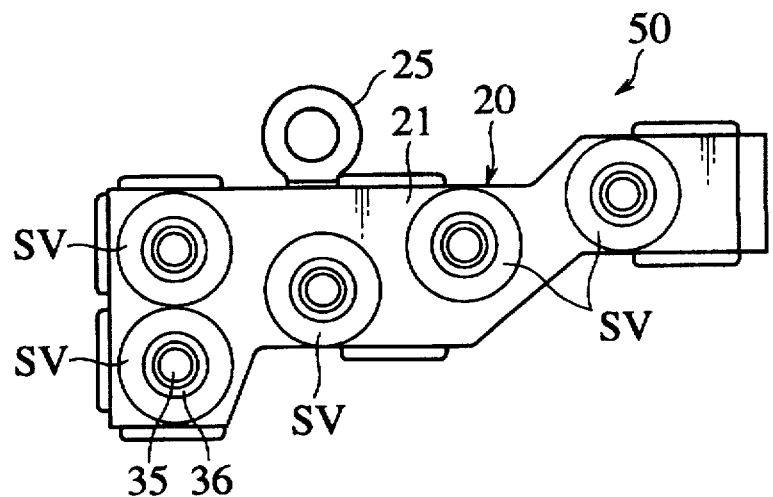
FIG. 3A is a plan view of the assembled solenoid unit of the embodiment.
Figure 3B:
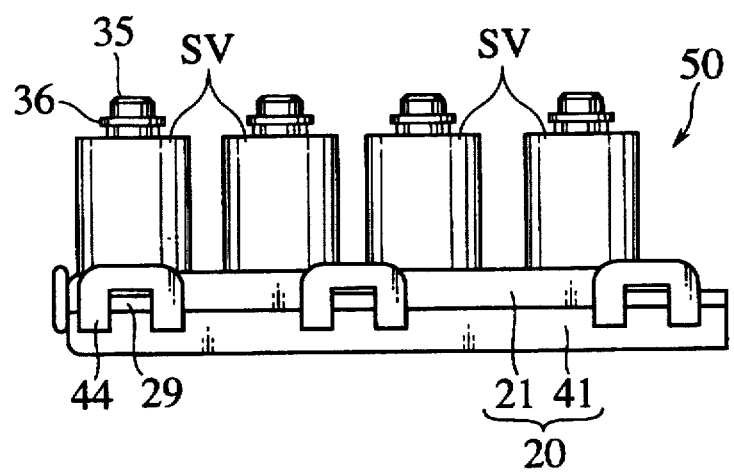
FIG. 3B is a front view of the assembled solenoid unit of FIG. 3A.
Figure 3C:
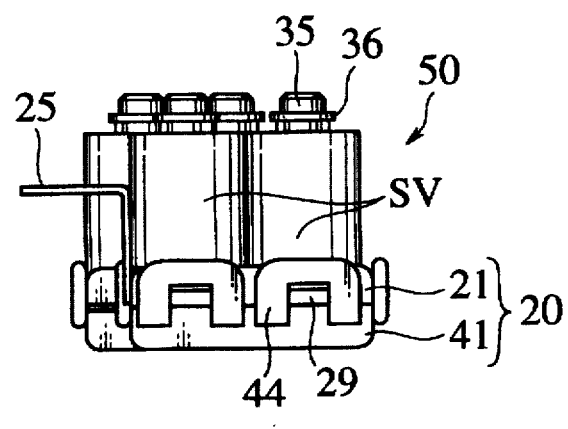
FIG. 3C is a side view of the assembled solenoid unit of FIG. 3A.

An embodiment of the present invention will be described with reference to drawings. In figures, FIG. 1 is a plan view of a solenoid unit 50 of the embodiment, showing an interior of the solenoid unit 50. Further, FIG. 2 shows a condition that a cover 41 of the solenoid unit 50 is detached, FIG. 3A a plan view of the solenoid unit 50, FIG. 3B a front view of the unit 50 and FIG. 3C is a side view of the unit 50.

The solenoid unit 50, which is integrated with a main casing 60 of an automatic transmission unit, includes a plurality of solenoid valves SV alias solenoids, and a case 20 equipped with the solenoid valves SV in a manner that they can be installed in the main casing 60 collectively. Each solenoid valve SV is provided, at a tip thereof, with a valve body (attachment part) 35 which is inserted into an insert port 61 of an oil hydraulic circuit in the main casing 60. Further, at the base end of the solenoid valve SV, a pair of pressure-welding terminals 23, 23 for the electrical connection are disposed inside a cylindrical solenoid casing.

The case 20 in the form of a flat box is made of a synthetic resinous material and shaped of a polygon projecting a substantial oblong in the plan view. The case 20 is composed of a case body 21 and a cover 41 for covering the case body 21. The case body 21 has a plurality of locking projections 29 formed on the outer periphery, while the cover 41 has a plurality of locking frames 44 formed on the outer periphery for respective engagement with the projections 29. When the case body 21 and the cover 41 are integrated with each other, they define a low inner space between opposing face plates 21a and 41a.

Being integral with the face plate 21a of the case body 21, a plurality of solenoid receptacles 21b with bottoms are formed so as to protrude toward the opposite side of the cover 41. In arrangement, the solenoid valves SV are accommodated in the solenoid receptacles 21b respectively, so that the respective valve bodies 35 project from through holes 37 formed in the bottoms of the receptacles 21b. Consequently, the projecting valve bodies 35 allow the assembly to be installed in the main casing 60.

About each valve body 35, a rubber packing (elastic member) 36 is attached for sealing up a clearance between the case 20 and the main casing 60 on condition that the valve body 35 is engaged into the corresponding insert port 61. The pressure welding terminals 23 of the solenoid valves SV are arranged to expose above the face plate 21a of the case body 21.

A ground terminal fixture 25 is attached to an interior face of the case body 21. The ground terminal fixture 25, which also serves as a fixture of the solenoid unit 50, is laterally arranged at a substantial center of the case 20 in the longitudinal direction (corres. to left and right directions in FIG. 1) so that the solenoid unit 50 can be carried by the main casing 60 under the well-balanced condition.

The ground terminal fixture 25 is made by folding a sheet of metal plate and comprises an oblong base plate portion 25a disposed on the face plate 21a of the case body 21 and a fixing plate portion 25b extending from the oblong base plate portion 25a through the intermediary of a winding plate portion 25c. The base plate portion 25a is secured, at three peripheral points thereof, to engagement hooks 26, 26, 27 projecting from the face plate 21a. Of the three points, two engagement hooks 26, 26 press two opposing sides of the oblong base plate 25a, while the remaining engagement hook 27 presses the remaining side of the oblong base plate portion 25a, which is opposite to the fixing plate portion 25b. Further, the base plate portion 25a is provided, on both sides in the width's direction, with pressure welding terminals (portions) 25d, 25d for earthing. Projecting from the case 20 outward, the fixing plate portion 25b in the form of an annular plate is provided with a bolt hole 25e and arranged in parallel with the face plate 21a.

In the two pressure welding terminals 23, 23 of each solenoid valve SV, one terminal is the same for electrical connection with a wire harness 33 on the vehicle side and the other terminal is the same for earthing. A ground wire 30 consisting of a covered wire is pressure-welded into the pressure welding terminal 23 to be grounded and the pressure welding portion 25d of the ground terminal fixture 25, successively. Through the intermediary of the ground wire 30, all of the pressure welding terminals 23 for earthing are electrically connected with the ground terminal fixture 25. Note, the respective wires 33a constituting the wire harness 33 are pressure-welded with the remaining pressure welding terminals 23 of the solenoid valves SV, respectively.

Under such a wired condition, the case body 21 is covered with the cover 41 and then secured and locked with it by respective engagements of the locking projections 29 with the locking frames 44. On condition that the cover 41 is locked on the case body 21 in this way, a projection (pusher) 42 projecting from the inner surface of the face plate 41a of the cover 41 depresses a center portion 28 of the base plate portion 25a of the ground terminal fixture 25, so that the ground terminal fixture 25 can be retained in the case 20 certainly. Again, the wire harness 33 is drawn out from the end of the case 20 in the longitudinal direction.

In fixing the above-constructed solenoid unit 50 with the main casing 60 of the automatic transmission unit, the base plate portion 25a of the ground terminal fixture 25 is adjusted to a not-shown screw hole in the main casing 60 while inserting the valve bodies 35 of the solenoid valves SV into the insert ports 61. From this state, a not-shown bolt is then screwed to fix the ground terminal fixture 25 on the casing 60. Consequently, simultaneously with the fixing the solenoid unit 50, the ground terminal fixture 25 are conducted with the main casing 60 of the automatic transmission unit, so that the ground connecting of the solenoid valves SV can be completed.

In this way, since the solenoid unit 50 of the invention is constituted by the case 20 equipped with the plural solenoid valves SV integrally, it is possible to assemble the solenoid valves SV to the main casing 60 collectively. Additionally, according to the invention, since there is no need to handle the wire harness every solenoid valve SV in order to connect each wire 33a with each pressure welding terminal 23, the assembling process can be simplified. Further, owing to the provision of the rubber packing 36 about the valve bodies 35 of the solenoid valves SV, the assembling error of the case 20 can be compensated thereby to improve the workability in assembling.

Again, since the ground connecting of the respective solenoid valves SV can be carried out simultaneously with the fixing of the solenoid unit 50 by fastening the ground terminal fixture 25 by the bolt, it is possible to exclude an individual ground-connecting of the solenoid valves SV, so that the ground-connecting operation can be simplified.

Particularly, by adopting the pressure welding terminals 23 for the terminal of solenoid valve SV, it is possible to complete the wiring in the solenoid unit 50 if only pressure welding of the wires 30, 33a, whereby the assembling of the solenoid unit 50 itself can be simplified, too.

Finally, it will be understood by those skilled in the art that the foregoing description is related to some preferred embodiments of the disclosed solenoid unit, and that various changes and modifications may be made to the present invention without departing from the spirit and scope thereof.

What is claimed is:

1. A solenoid unit for an automatic transmission unit having a main casing, said solenoid unit comprising:
    a plurality of solenoid valves having respective attachment parts for attachment with the main casing of the automatic transmission, said attachment parts including a valve body; and
    a case in which said solenoid valves are arranged in a manner that said solenoid valves can be installed in the main casing collectively;
    wherein the wiring against said solenoid valves in said case has been completed, and each of said solenoid valves includes a solenoid case and pressure welding terminals for electrical connection, to which electrical wires are fitted under pressure respectively, the pressure welding terminals being arranged inside said solenoid case.

2. A solenoid unit as claimed in claim 1, wherein each of said attachment parts is provided with a single elastic member for compensating assembling deviations of said solenoid unit relative to the main casing of the automatic transmission unit.

3. A solenoid unit as claimed in claim 2, wherein said elastic member is composed of a rubber packing for seal.

4. A solenoid unit for an automatic transmission unit having a main casing, said solenoid unit comprising:
    a plurality of solenoid valves having respective attachment parts for attachment with the main casing of the automatic transmission;
    a case in which said solenoid valves are arranged in a manner that said solenoid valves can be installed in the main casing collectively;
    wherein the wiring against said solenoid valves in said case has been completed;
    wherein each of said solenoid valves is provided with a solenoid case and wherein each of said solenoid valves includes pressure welding terminals for electrical connection, to which electrical wires are fitted under pressure respectively and which are arranged inside said solenoid case; and
    wherein said case is provided with a ground terminal fixture also serving as fittings for attaching said case to said main casing and wherein said pressure welding terminals of said solenoid valves are electrically connected with said ground terminal fixture through said electrical wires, thereby providing a ground circuit.

5. A solenoid unit as claimed in claim 4, wherein said case comprises a case body and a cover locked on said case body for covering it, while said ground terminal fixture is composed of a base plate portion positioned in and fixed with said case of said solenoid unit and a fixing plate portion projecting from said case and having a bolt hole formed therein and wherein said cover is provided with a pusher for depressing said base plate portion of said ground terminal fixture against said case body on condition that said cover is locked on said case body.

6. A solenoid unit as claimed in claim 5, wherein said case body has a plurality of locking projections arranged about an outer periphery of said case body, while said cover is provided with a plurality of locking frames for respective engagements with said locking projections, which are arranged about an outer periphery of said cover.

7. A solenoid unit as claimed in claim 6, wherein said base plate portion of said ground terminal fixture is provided, on both sides thereof, with pressure welding portions into which said electrical wires are fitted under pressure.

8. A solenoid unit as claimed in claim 7, wherein said ground terminal fixture is positioned at a substantial center of said case in a longitudinal direction thereof.

* * * * *